July 17, 1951  N. F. MOODY  2,561,066
TIME BASE CIRCUITS FOR OSCILLOGRAPHS
Filed Oct. 25, 1947
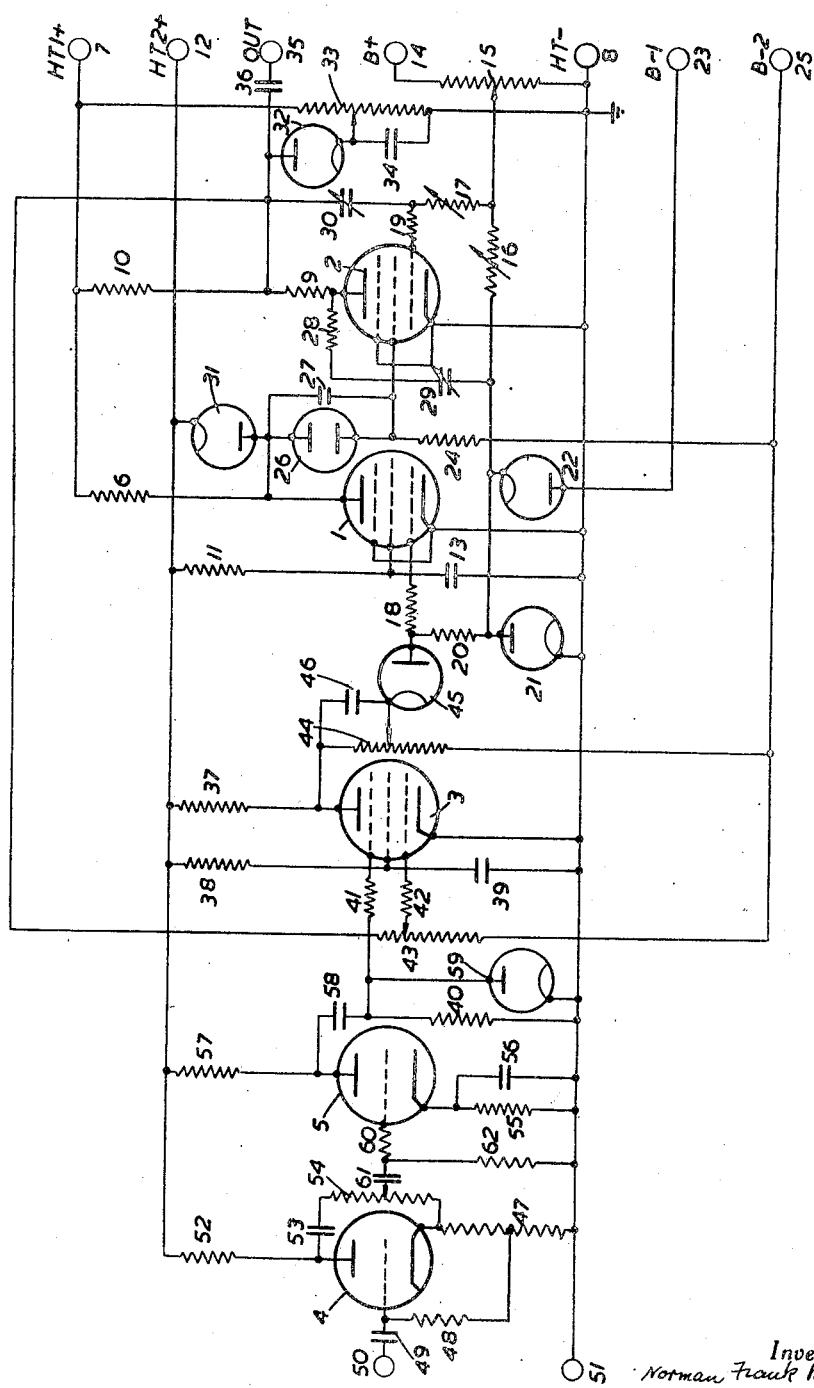
Inventor
Norman Frank Moody
By Philip M. Bolton
Attorney Patented July 17, 1951

2,561,066

UNITED STATES PATENT OFFICE 2,561,066

TIME BASE CIRCUITS FOR OSCILLOGRAPHS

Norman Frank Moody, Aldwych, London, England, assignor to International Standard Electric Corporation, New York, N. Y., a corporation of Delaware Application October 25, 1947, Serial No. 782,188
In Great Britain September 27, 1946

Section 1, Public Law 690, August 8, 1946
Patent expires September 27, 1966

4 Claims. (Cl. 250—36)

The present invention relates to time-base circuits for cathode ray oscillographs.

The principal object of the invention is to provide a time-base circuit which gives a deflecting voltage which changes with time in an accurately linear manner, and is capable of producing a succession of deflections of the oscillograph indicating element repeated at any desired frequency; while at the same time is capable of being synchronised by an applied periodic wave or train of trigger pulses which may be repeated at any frequency which may be widely different from that at which the circuit runs when uncontrolled.

The invention achieves this object by providing a time-base circuit for a cathode ray oscillograph, comprising a plurality of multi-electrode thermionic valves, the potentials of the electrodes of which, in response to an applied trigger pulse, pass through a predetermined cycle of changes and then revert to a quiescent or stable condition, in which the application of the pulse causes a linear fall of anode voltage of a first of the said valves, and in which a second valve controls the return of the circuit to the quiescent condition, characterised in this, that means is provided for deriving the said trigger pulse from the said first valve in such manner that the circuit operates periodically.

The invention will be explained in terms of an embodiment a schematic circuit diagram of which is shown in the figure of the accompanying drawing. An important part of the circuit of the embodiment comprises a time base circuit of the kind described with reference to Fig. 1 of British Patent No. 587,364 to F. C. Williams and N. F. Moody, accepted April 23, 1947. This circuit is adapted to be controlled by short negative trigger pulses, and in response to each pulse goes through one operation. During a period commencing with the trigger pulse, the circuit generates a voltage which varies with time in an accurately linear manner. At the end of this period, it also generates a pulse with a very steep leading edge.

In the embodiment of the invention shown in the accompanying figure, which shows a schematic circuit diagram of the embodiment, this steep edged pulse is applied to the control grid of an additional normally blocked valve and unblocks the valve, thereby producing a trigger pulse which is applied to operate the time-base circuit again. The circuit therefore functions periodically and generates a continuous succession of deflecting voltages, the frequency of repetition of which may be controlled over a wide range by adjusting the time constants of certain resistance-capacity coupling circuits.

Referring now to the accompanying figure, the two pentode valves 1 and 2 with their associated circuits are arranged substantially in the manner described in the above-mentioned specification. The pentode valve 3 is the normally blocked valve which is added according to the present invention for the purpose of causing the time-base circuit to operate continuously in the manner already mentioned. Two further amplifying valves 4 and 5 are provided according to another feature of the invention, for the purpose of applying triggering pulses or other controlling periodic waves to the valve 3 for synchronising the time-base circuit, in a manner which will be explained later.

The circuits associated with the valves 1 and 2 will first be described. The cathodes and suppressor grids of these valves are connected to ground. The anode of the valve 1 is connected through a resistance 6 to the positive terminal 7 for the high voltage source (not shown) for the valves 1 and 2, the negative terminal 8 of which is preferably grounded. The anode of the valve 2 is connected through two resistances 9 and 10 in series to terminal 7. The screen grid of the valve 1 is connected through a resistance 11 to the positive terminal 12 of a second high voltage source (not shown) which may be of a lower voltage than the first source. The negative terminal of this source can be the terminal 8. The screen grid of the valve 1 is also connected to ground through a large by-pass condenser 13.

A terminal 14 is provided for a positive bias source (not shown) for the control grids of the valves 1 and 2. Terminal 8 may be used for the negative terminal of this source. An adjustable potentiometer 15 is connected between terminals 8 and 14, and the movable contact of this potentiometer is connected through adjustable resistances 16 and 17 to the control grids of the valves 1 and 2, current limiting resistances 18 and 19 being included as indicated. A further resistance 20 is also connected between resistances 16 and 18, as shown, and two diodes 21 and 22 are also provided. The diode 21 has its cathode grounded and its anode connected to the junction point of resistances 16 and 20. The diode 22 has its cathode connected to this junction point, and its anode to a terminal 23 for a first negative bias source (not shown) of a few volts.

The screen grid of the valve 2 is connected through a resistance 24 to a terminal 25 for a second negative bias to source (not shown) of relatively high potential. The anode of the valve 1 is also coupled to the screen grid of the valve 2 through neon tube 26, which is shunted by a relatively large by-pass condenser 27.

The anode of the valve 2 is coupled to the control grid of the valve 1 through a resistance 28 and an adjustable condenser 29, which is connected to the junction point of the resistances 18 and 20.

An adjustable condenser 30 is used for coupling the anode of the valve 2 to its own control grid, and is connected between the junction point of the resistances 9 and 10 and the junction point of the resistances 17 and 19.

The anode of the valve 1 is connected to the anode of a diode 31, the cathode of which is connected to terminal 12. This diode prevents the anode potential of the valve 1 from exceeding the potential of the second high voltage source. Another diode 32 has its anode connected to the junction point of resistances 9 and 10 and its cathode to the movable contact of a potentiometer 33 connected between terminals 7 and 8, the lower part of which is shunted by a by-pass condenser 34. This diode prevents the potential of this junction point from rising above the value determined by the setting of this potentiometer. This junction point is also connected to an output terminal 35 through a blocking condenser 36. The time-base voltage is obtained from this terminal, and may be applied in any suitable way to the deflecting elements of an oscillograph (not shown).

The circuit which has been described so far is substantially the same as that described in the specification already mentioned, apart from small matters of detail. In the unoperated or quiescent condition, the valve 1 is conducting, the control grid being at a small positive potential, and its anode potential is accordingly low. The potential of the screen grid of the valve 2 will accordingly be at some negative potential which differs from the anode potential of the valve 1 by a fixed amount as determined by the neon tube 26. The anode current of the valve 2 is accordingly cut off, and the anode voltage has the maximum value determined by the setting of the potentiometer 33.

During normal operation of the time-base circuit, a negative trigger pulse will be applied to the control grid of the valve 1, and thus cuts off the valve. The diode 22 prevents the negative potential of the control grid from exceeding a few volts, as determined by the negative source connected to terminal 23. When the valve 1 is cut off, the anode voltage rises to the maximum determined by the source connected to terminal 12, suddenly unblocking the valve 2. After an initial sharp fall in the anode potential of the valve 2 (which is fed through the condenser 29 to the valve 1 and maintains it cut off), this potential continues to fall in a linear manner as a result of the feedback through the condenser 30.

At the end of the period of operation, when the circuit returns to the quiescent condition, the anode potential of the valve 2 suddenly rises and transmits a positive terminating pulse through condenser 29 to the control grid of the valve 1, which sharply unblocks this valve. The resulting sharp rise in the anode voltage of this valve then cuts off the anode current of the valve 2 and the circuit remains in this stable quiescent condition until another trigger pulse is received.

The negative trigger pulses for operating the circuit are obtained according to the invention by means of the valve 3, as already explained. The cathode of this valve is connected to ground, and the anode is connected to terminal 12 through a resistance 37. The screen grid is connected to terminal 12 through a resistance 38 and to ground through a by-pass condenser 39. The suppressor grid is normally maintained practically at earth potential by a grounded resistance 40 connected to the suppressor grid through a small current limiting resistance 41.

The control grid of the valve 3 is connected through a current limiting resistance 42 to the movable contact of a potentiometer 43 connected between the junction point of resistances 9 and 10 and terminal 25. The anode of the valve 3 is connected to terminal 25 through a potentiometer 44, the movable contact of which is connected to the cathode of a diode 45, the anode of which is connected to the control grid of the valve 1 through the resistance 18. The upper portion of the potentiometer 44 is shunted by a condenser 46.

It will be seen that the potential variations of the valve 2 will be directly communicated to the control grid of the valve 3. The potentiometer 43 should be adjusted so that the valve 3 is just unblocked when the anode potential of the valve 2 is a maximum, but so that it is cut off after the initial sharp fall of potential of the valve 2.

In these circumstances, assuming that an operation of the circuit has started (which will normally occur at the moment of switching on the high voltage), the anode voltage of the valve 2 falls linearly to the minimum value, and then as already explained rises sharply at the end of the period of operation. This sharp rise unblocks the valve 3, so that its anode generates a negative pulse which is transmitted through the diode 45 to the valve 1 and starts another operation, which blocks the valve 3. At the end of the operation, the valve 3 is again unblocked, and another negative pulse is produced which initiates a further operation, and so on, that a regularly repeated series of operations returns.

It will be noted that the valve 3 will generate a positive pulse each time it is cut off after starting a new operation. This positive pulse is prevented from reaching the valve 1 by the diode 45.

The resistance 20 and diode 21 are included to limit the grid current of the valve 1 at the end of the operating period, by preventing the grid potential from rising to a high positive value, in order to reduce the load which would otherwise be imposed on the valve 3, which has to drive the grid of the valve 1 to a negative potential in order to start a new operation.

The period of oscillation is determined chiefly by the values of the elements 16, 17, 29 and 30 which may be adjusted accordingly. If desired means (not shown) may be provided for adjusting all these elements simultaneously by means of a single control.

In order to synchronise the operation of the time-base circuit to a train of pulses or periodic waves of any desired frequency, the two amplifier valves 4 and 5 are provided.

The valve 4 is arranged as a cathode follower with a resistance 47 connecting the cathode to ground. The control grid is connected to a tapping point on this resistance through a resistance 48, and through a blocking condenser 49 to an input terminal 50 for the synchronising pulses. The corresponding grounded input terminal is 51.

The anode of the valve 4 is connected to terminal 12 through a resistance 52, and to the cathode through a condenser 53 and a potentiometer 54.

The cathode of the valve 5 is connected to ground through a conventional bias network consisting of a resistance 55 shunted by a condenser 56. The anode is connected to terminal 12 through a resistance 57, and to resistance 40 through a condenser 58. A diode 59 having its cathode grounded shunts the resistance 40.

The control grid of the valve 5 is connected to the movable contact of the potentiometer 54 through a current limiting resistance 60 and a blocking condenser 61, the usual grid resistance 62 being connected between the junction point of these elements and ground.

The diode 59 acts as a rectifier to build up in the condenser 58 a negative blocking bias potential for the suppressor grid of the valve 3 when a train of synchronising pulses or other periodic waves are applied to terminals 50 and 51. The potential reached by the condenser 58 will be such that each time the anode of the valve 5 reaches a positive maximum the suppressor grid potential is raised just to zero and the valve 3 will be unblocked, thus delivering a negative trigger pulse to the valve 1. In other words, the tip of each positive pulse from the anode of the valve 5, or the positive crests of a periodic synchronising wave, will unblock the valve 3 and will produce a corresponding negative trigger pulse.

The condenser 53 forms with the potentiometer 54 a phase changing network by which it is possible to adjust the phase of the synchronisation by adjusting the potentiometer 54. It will be seen that when a periodic synchronising wave is applied to terminal 50, the wave will be obtained in the same phase from the cathode of the valve 4 and in opposite phase from the anode. It will be clear that by suitably adjusting the potentiometer any intermediate phase could be obtained.

It will also be clear that if the time-base circuit is executing a series of regularly repeated operations at any frequency, and then synchronising pulses or waves are applied to terminal 50, the first effect will be to block the valve 3 by means of the suppressor grid, so that it cannot be unblocked by the pulse which comes from the valve 2. The operation therefore stops at the end of one of the operation periods, with the valve 1 conducting and the valve 2 cut off, and the circuit will wait until a trigger pulse is applied to the control grid of the valve 1. The first synchronising pulse or wave after the blocking of the valve 3 by the suppressor grid supplies this trigger pulse by momentarily unblocking this valve on the suppressor grid. The circuit makes one operation, and again stops because the valve 3 is blocked. The next synchronising pulse then produces another operation, and so on. In general the uncontrolled oscillation period should be adjusted so that it does not exceed the period of the synchronising pulse, otherwise the circuit will not have time to complete an operation between two synchronising pulses. The oscillation period could have any value less than the period of the synchronising pulses, and in that case, these pulses will completely control the circuit irrespective of the free oscillation period.

It may be added, however, that after an operation has been started, the valves 1 and 2 will be insensitive to trigger pulses until almost at the end of the period of one operation, so that by suitably adjusting the elements 16, 17, 29 and 30, it would be possible to synchronise the circuit on a submultiple of the frequency of the synchronising pulses. In this case, after one of these pulses had started an operation, several succeeding pulses would arrive while the circuit was insensitive, and would have no effect. Only the pulse which arrives just at or after the end of the operation period can re-operate the circuit.

When the synchronising pulses or waves are removed, the condenser 58 will discharge through the resistance 40, the valve 3 will be unblocked, and the circuit will resume its periodic operations.

It will be understood that many of the details of the circuit which has been described may be modified if desired without changing the essential features of the invention. For example, it is not necessary that several different high voltage and bias sources should be provided. This is merely a matter of convenience and will be determined partly by the types of valve used in the circuit.

The various diodes could be replaced by other types of rectifiers, and the valves 4 and 5 could if desired be pentodes with the extra grids polarised in conventional ways.

What I claim is:

1. A time-base circuit for a cathode ray oscillograph comprising a two-tube pulse triggered circuit of the type biased to have a stable quiescent state and an unstable operating state with the anode of each of the first and second tubes coupled to the grid of the other tube and producing at the output of said second tube while in said operating state a pulse having a linear slope for sweep purposes and a relatively steep trailing edge, a normally blocked third tube having an output electrode coupled to an input electrode of said first tube, coupling means connected between the output of said triggered circuit and an input electrode of said third tube for unblocking said third tube at the end of the operating state to produce a triggering pulse at the output electrode of said third tube, a source of synchronizing voltage to control the frequency of operation of said triggered circuit, storage means for deriving a blocking bias voltage from said synchronizing voltage, means for applying said blocking bias to an additional grid of said third tube to maintain said third tube blocked irrespective of feedback voltage from said triggering circuit, and coupling means for applying said synchronizing voltages to the additional grid of said third tube to momentarily unblock said third tube in response to said synchronizing voltages, thereby producing a train of triggering pulses at the output electrode of said third tube.

2. A time-base circuit according to claim 1, wherein there is further provided a fourth tube, having its anode coupled to ground through a condenser in series with a parallel arrangement of a resistance and a rectifying device, said condenser being connected between the output electrode of said fourth tube and said additional grid of said third tube.

3. A time-base circuit according to claim 2 in which the synchronising waves are applied to the control grid of the fourth tube through a fifth tube arranged as a cathode follower.

4. A time-base circuit according to claim 3 in which the control grid of the fourth tube is connected to the movable contact of a potentiometer connected in series with a condenser between the anode and cathode of the fifth tube.

NORMAN FRANK MOODY.

REFERENCES CITED

The following references are of record in the file of this patent:

UNITED STATES PATENTS

| Number | Name | Date |
| --- | --- | --- |
| 2,155,210 | Young | Apr. 18, 1939 |
| 2,265,290 | Knick | Dec. 9, 1941 |
| 2,423,931 | Etter | July 15, 1947 |
| 2,452,549 | Cleeton | Nov. 2, 1948 |
| 2,461,871 | Bass | Feb. 15, 1949 |
| 2,463,073 | Webb | Mar. 1, 1949 |
| 2,480,599 | Oxford | Aug. 30, 1949 |